April 7, 1931. L. H. BUTLER 1,799,726
METHOD AND APPARATUS FOR THE RECEPTION OF BROADCAST RADIO FREQUENCIES
Filed Feb. 26, 1926
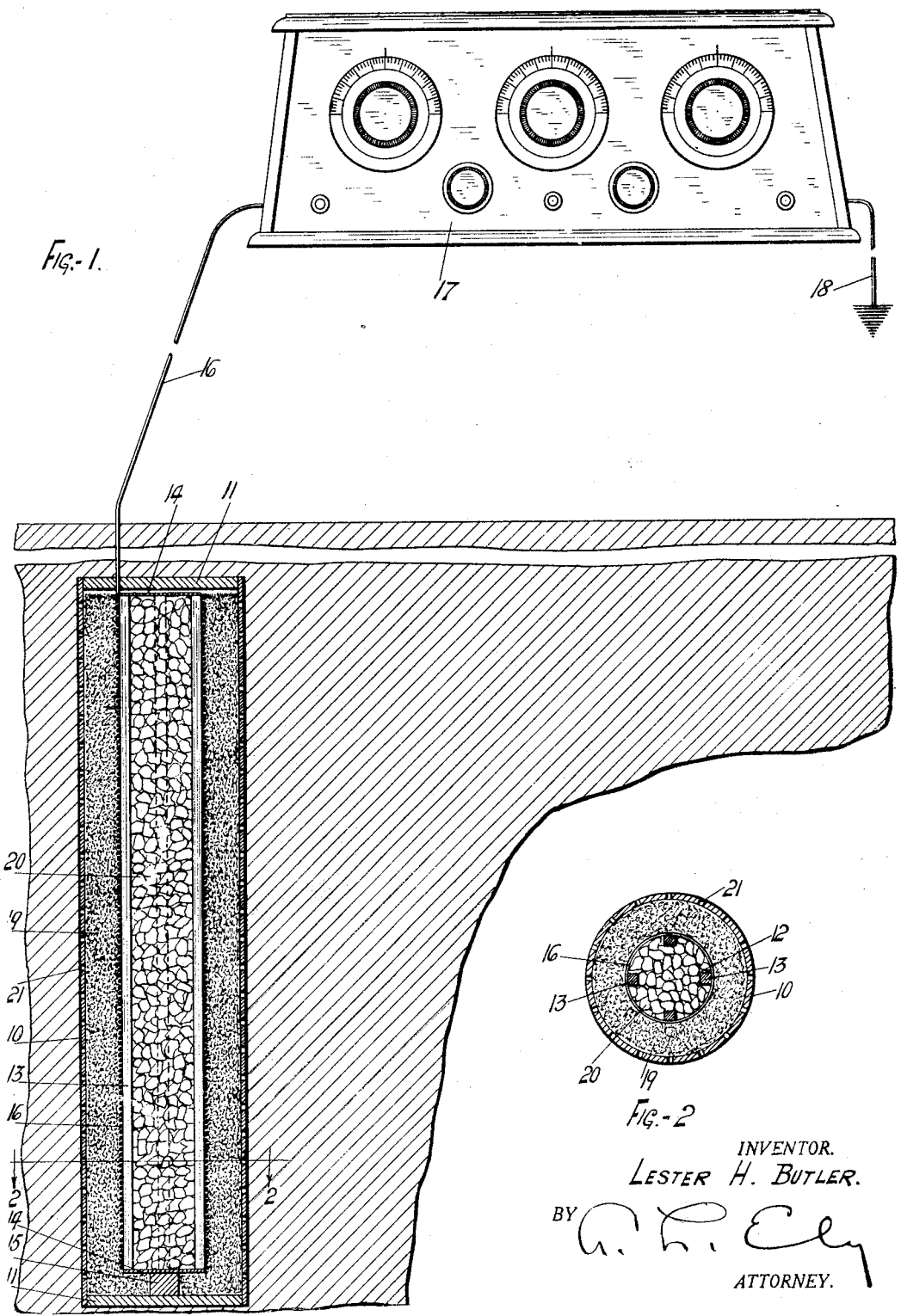
INVENTOR.
LESTER H. BUTLER.
BY
ATTORNEY.

Patented Apr. 7, 1931

1,799,726

UNITED STATES PATENT OFFICE

LESTER H. BUTLER, OF AKRON, OHIO

METHOD AND APPARATUS FOR THE RECEPTION OF BROADCAST RADIO FREQUENCIES

Application filed February 26, 1926. Serial No. 90,776.

The present invention relates to a method and apparatus for the reception of broadcast radio frequencies, the object of the invention being to improve upon existing practices and secure new and highly beneficial results in this art.

The device and the method herein shown and described has achieved excellent results in the reception of broadcast radio. Its advantages and points of improvement over older apparatus for the reception of impulses are many. The apparatus is used as a substitute for the usual aerial or loop antenna.

The apparatus in its preferred form consists of a galvanic battery which is preferably buried in the ground and in intimate electrical contact with the ground, the current which is slowly and continuously generated in the battery being connected to the radio set and serving to transmit the radio frequencies from the ground to the set.

The apparatus herein shown has been operated with very satisfactory results and has many advantages over any other form of aerial or antenna known to me. One of its chief advantages lies in the fact that it is non-directional and permits of a wide range of selectiveness. It is also very sensitive and will pick up radio frequencies which cannot be obtained in the older forms of reception devices of equal length.

It will be appreciated that while only one form of the device is shown and described herein, the invention is not limited to this form, but may be used in many modifications within the broad range of the invention as permitted by the prior art. The method herein may be practised in many different forms, for, having explained the principles of the invention to those skilled in the art, it is possible that other embodiments may be devised entirely within the principles of the invention.

In the drawings in which a practical and operative form of the invention is shown:

Figure 1 is an assembly view of the device connected to a radio set, the receiver being shown in vertical section; and Figure 2 is a transverse section on the line 2—2 of Figure 1.

The device comprises a hollow shell or cylinder 10, preferably of zinc, constituting the negative element of the galvanic cell. The ends of the shell are closed by wooden plates or disks 11. Centrally mounted within the shell is a cage or framework 12 made of a plurality of vertical wood strips 13 attached to wooden disks 14 at either end; the cage being spaced from the top of the shell and supported at the bottom by a block 15. The framework 12 is surrounded by a long coil or cage of copper wire 16 constituting the positive element, the lower end of which is an unattached or dead end and the upper end of which passes out through the top of the apparatus and is connected to the radio set 17. The illustration of said radio set 17 shows the casing, tuning dials and rheostat knobs of the ordinary electron-tube apparatus for transforming radio-frequency waves into those of audio frequency and tuning the circuits to respond to different frequencies of transmission. The electrical circuit is completed by a connection 18 to the ground.

The cage 12 is spaced from the zinc shell by a packing of porous, non-conducting material, such as sawdust 19, and the interior of the cage is packed with crystals of copper sulphate 20. The zinc casing is perforated by numerous small openings 21 which admit moisture from the ground, the moisture reaching the sawdust and permeating it. The crystals of copper sulphate slowly dissolve and permeate the sawdust with a solution of the electrolyte.

In the preferred practise, the shell is buried in the ground to a sufficient depth to be below the frost line. The water within the ground keeps the porous filler 19 in moist condition so that the entire apparatus becomes a low voltage, galvanic battery, the voltage being sufficient to pick up radio frequencies in the ground and transmit them to the set.

While the ordinary dead-end antenna is in a line which remains open except through the radiation medium or ether, this galvanic-cell antenna device, in the preferred arrangement here illustrated, is placed in a closed circuit which has the usual course through the receiving set 17 and the metallic ends of which at the zinc terminal 10 and at the ground wire 18 are electrically connected through the intervening earth. Hence a weak direct current is constantly flowing in the antenna circuit, and if this circuit includes, as usual, the primary of an induction coil, any pulsations in said current will be inductively felt in the secondary of said coil and communicated to the remainder of the usual receiving devices in the set.

I consider it probable that these pulsations are produced by a variation of electron release and flow in the galvanic cell caused by the alternate augmentation and opposition of the alternating radio frequencies received upon the copper coil 16.

Changes and modifications in form and proportion may be made within the scope of the invention. Other forms of galvanic batteries may also be designed for this purpose, and changes of material may be made without, however, varying the operation and principles of the invention. Other materials may be substituted for the positive and negative elements of the battery, for the electrolyte, and for the porous filler.

The cell is shown buried in vertical position and the copper sulphate crystals located within the cage. Both of these features may be varied as the cell can be buried in any position, and the crystals of copper sulphate or other electrolyte may be incorporated in the filler.

What is claimed is:

1. The method of radio reception which comprises generating a direct current by galvanic action on an antenna, and causing pulsations in said current by means of radio frequencies received by said antenna.

2. The method of radio reception which comprises generating a direct current by chemical action upon a buried antenna, maintaining said chemical action with the aid of earth moisture, and causing pulsations in said current by means of radio frequencies received by said antenna.

3. A radio antenna device comprising a low-potential galvanic cell having elements, one of which is of sufficient capacity to act as a receiving antenna in coaction with the other element and the electrolyte.

4. A radio receiving antenna cell comprising a metallic shell an antenna enclosed thereby, and an intervening moistened filler including a body of comminuted, porous material of the nature of wood sawdust.

5. A galvanic radio receiving antenna device comprising a negative metallic shell exposed for side contact with the ground, a positive antenna within said shell, and an intervening, porous, non-conductive filler moistened with an electrolyte.

6. An apparatus for the purposes set forth, comprising a galvanic battery having a zinc shell and an antenna coil of copper wire within the shell, a porous non-conducting filler between the coil and the shell, and means for supplying an electrolyte to said filler.

7. An apparatus for the purposes set forth, comprising an electrical generator of low voltage buried in the ground and having electrical contact therewith, said generator including an antenna element, and a connection from the antenna element to a radio receiving set.

8. An apparatus for the purposes set forth, comprising a galvanic battery buried within the ground and having an outer perforated shell of zinc, an antenna coil of copper wire within the shell, a porous non-conducting filler between the shell and the wire, a supply of electrolyte in soluble form also within the shell, and a connection between the wire and a radio receiving set.

9. An apparatus for the purposes set forth, comprising a galvanic battery having an outer metal shell element and a metal element of the opposite polarity within the shell, one of said metal elements acting as an antenna, a supply of electrolyte within the shell, and electrical connections between the battery and the ground and between the antenna and the radio receiving set.

10. An apparatus for the purposes set forth, comprising a galvanic battery having a perforate outer shell of zinc, a hollow antenna coil of copper wire within the shell, a porous non-conducting filler between the shell and the coil, and copper sulphate crystals within the coil, the battery being buried under ground and the antenna coil connected to a radio receiving set.

11. An apparatus for the purposes set forth, comprising a galvanic battery comprising a shell of zinc in electrical contact with the ground, a hollow, positive antenna element within the shell, a porous filler surrounding the antenna element, an electrolyte in soluble form within the antenna element, the filler receiving moisture from the ground, and connections from the antenna element to a radio receiving set.

12. A receiver for radio comprising a shell, a coil of antenna wire in the shell, a non-conducting porous filler between the shell and the wire, and crystals for forming an electrolyte in the shell, the shell being perforated and the coil of wire adapted to be connected to a radio receiving set.

13. A receiver for radio comprising a zinc shell, a coil of copper antenna wire in the shell, a non-conducting porous filler between the shell and the wire, and crystals of copper sulphate in the shell, the shell being perforated and the coil of wire adapted to be connected to a radio receiving set.

14. A radio receiving antenna cell comprising a metallic shell, an antenna enclosed thereby, and an intervening comminuted, porous filler moistened with a solution of an ionizing salt.

LESTER H. BUTLER.